May 10, 1938.   F. CONRAD   2,117,019
DOUBLE WINDING GENERATOR AND RECTIFIER COMBINATION
Filed June 20, 1936
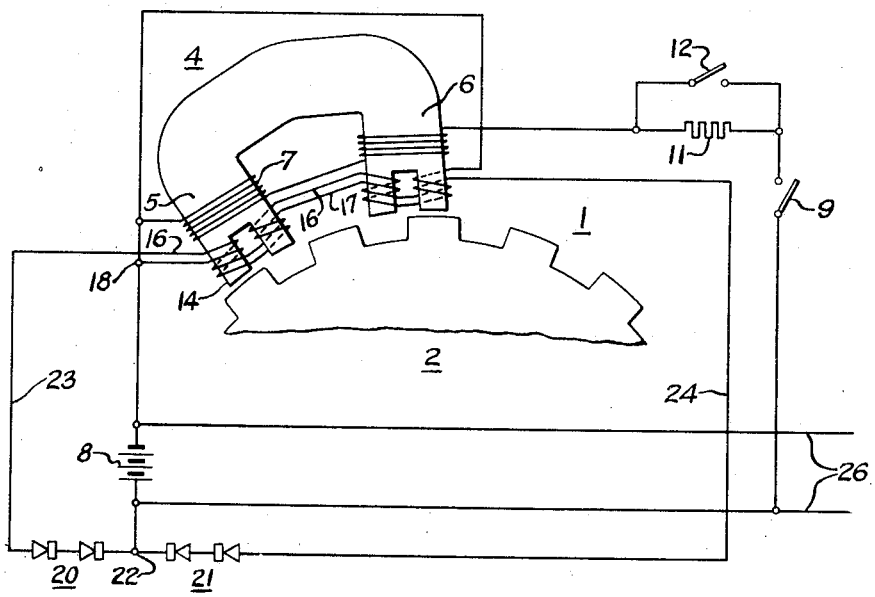
WITNESSES:
INVENTOR
Frank Conrad.
BY
ATTORNEY Patented May 10, 1938

2,117,019

UNITED STATES PATENT OFFICE 2,117,019

DOUBLE-WINDING GENERATOR AND RECTIFIER COMBINATION

Frank Conrad, Wilkinsburg, Pa., assignor of one-half to Westinghouse Electric & Manufacturing Company, East Pittsburgh, Pa., a corporation of Pennsylvania, and one-half to Chrysler Corporation, Detroit, Mich., a corporation of Delaware Application June 20, 1936, Serial No. 86,363

6 Claims. (Cl. 171—314)

My invention relates to a double-winding generator and rectifier combination of such nature that the size of the rectifier may be reduced, at the expense of utilizing two generator-windings, thereby effecting a saving over a similar installation utilizing only a single generator-winding but a larger rectifier.

My invention has particular relation to a battery-charging system for automobiles or other self-propelled transportation devices, utilizing a variable-speed, double-winding, high-frequency alternator having a more or less constant-current output under normal conditions, in combination with two half-wave rectifiers for supplying rectified current to the battery.

The principal object of my invention is to provide a combination of alternating-current generator and rectifier, for automobile battery-charging, which will utilize a minimum number of plates, cells or units of the rectifier.

A further object of my invention is to provide a novel type of double-winding alternator which is susceptible of successful use in such a rectifier circuit.

With the foregoing and other objects in view, my invention consists in the apparatus, combinations, circuits, systems and methods hereinafter described and claimed, and illustrated in the accompanying drawing, the single figure of which is a diagrammatic view of the circuits and apparatus embodying my invention in a preferred form.

In the drawing, I have shown a variable-speed, high-frequency, inductor-type alternator 1 of an approximately constant-current type, the same being adapted to be driven at variable speeds from power derived from the prime mover of a self-propelled transportation-device (not shown). This alternator comprises a rotor member 2 which consists of an unwound toothed magnetizable wheel, the rotor-teeth being projected either radially or laterally from the rotor-wheel. The alternator has a stator-member comprising a magnetizable stator-core 4 which is illustrated as comprising a small appendage on the side of the rotor-wheel 2. As shown, the stator-core comprises two polar members 5 and 6 which are excited by a direct-current winding 7 which is energized from a storage battery 8 through a switch 9 and a voltage-regulator which is diagrammatically illustrated by means of a resistor 11 shunted by a switching-means 12.

Each of the polar members 5 and 6 of the stator-core 4 is sub-divided into one or more pairs of stator-teeth 14 which are disposed close to the rotor-teeth and so related to the latter as to produce heavy tooth-flux pulsations as the rotor-teeth pass under the stator-teeth, the several stator-tooth flux-pulsations being alternately substantially in phase opposition to each other. The stator teeth 14 are wound with two armature windings 16 and 17, which are similar to each other, with coils wound oppositely on alternate teeth so that the generated electro-motive forces will be additive. The two armature windings 16 and 17 are connected in series so as to provide a mid-point 18 which is connected to one terminal of the storage battery 8 which is to be charged.

In accordance with my invention, I utilize two half-wave rectifiers 20 and 21, serially connected in opposition to each other so as to provide a mid-point 22 which is connected to the other terminal of the battery 8. The two end-terminals of the rectifiers 20 and 21 are connected by conductors 23 and 24 to the respective end-terminals of the windings 16 and 17.

In operation, it will be noted that, during one half-cycle of the generator-output, the generator-winding 16 will be delivering current, the current leaving the coil on the first stator-tooth marked 14 by way of the conductor marked 16, and passing thence through the conductor 23 to the rectifier 20 and thence to the battery 8 and the direct-current load-circuit 26. During this half-cycle, the generator-winding 17 cannot deliver current because the rectifier 21 is connected in the wrong direction to conduct any material amount of current. During the next half-cycle, the generator-winding 17 is delivering current, and it will be noted that the current is flowing through the coil on the first stator-tooth marked 14 in the opposite direction from the direction in which the current was flowing in the preceding half-cycle, the current entering this coil through the conductor marked 17, and thence passing through the rest of the winding 17 and returning, through the conductor 24 and the rectifier 21, to the battery 8 and the direct-current load-circuit 26. It will be noted that the current is flowing, in alternating half-cycles, so as to produce a magnetic reaction in the first tooth 14, first in one direction and then in the other, and the same for all of the other stator-teeth, thus avoiding the building up of a saturating uni-directional flux, such as would be produced if the magnetic reaction were always in the same direction in the tooth 14 or in any other part of the stator-core 4.

It will be understood that the stator-core 4 must be made of a thin lamination or laminations, at least the toothed portion 14 thereof which carries an alternating flux.

It will be observed that my battery-charging system, utilizing a double-winding generator 1 and a rectifier 20, 21, is particularly advantageous by reason of the fact that it can be made in standard unit-sizes, so that battery-charging systems which require more power may be obtained by the simple process of duplicating or multiplying the units, connecting more units in parallel or in series as may be required. This is particularly advantageous in battery-charging systems for large buses where the present direct-current charging-generators which are utilized are of a relatively high cost, principally because of the low quantity of production, which difficulty is avoided in my present invention.

My combination utilizing a double-winding generator is particularly useful, as compared to a single-winding generator utilizing a bridge-connected rectifier-set. Thus, for example, assume that two rectifier cells or elements are desired in series, to withstand the back-voltage and to afford the factor of safety which will permit the device to be operative even in the event of failure of one of the cells or elements. In a bridge rectifier, there would be four bridge-arms of two cells each, or eight cells, whereas my rectifier utilizes only half as many.

A single-winding generator could not be satisfactorily utilized, with a mid-tap and a two-branched rectifier-set such as my rectifier-set 20, 21, because then one half of the generator-winding would carry only positive pulsations of current, and the other half would carry only negative pulsations of current, building up saturating unidirectional fluxes in the portions of the stator-core spanned by the respective halves of the single stator-winding.

It will thus be apparent that, by the simple and inexpensive expedient of providing an extra set of windings on the small stator-appendage 8 of my inductor alternator 1, I save the expense of half of the rectifier-equipment which would be otherwise required.

There is another, and still more important, reason why my special double-winding arrangement and connection should be utilized in my generator. This reason is quite separate from considerations of magnetic saturation effects, which could be tolerated. It arises from the fact that the generator is an alternating-current source of extremely poor voltage-regulation or what may be called an approximately constant-current characteristic, resulting from the high frequency and the large armature-reaction of the generator. Thus the no-load or generated voltage at high speed is much larger than, even many times, the terminal voltage under normal load-conditions, or the voltage generated at the lowest operative speed. In other words, the generator at times actually develops a voltage many times the voltage which is delivered to the rectifier under normal current conditions, this difference in voltage representing the reactive impedance-drop effect and the effect of the back ampere turns of the armature-reaction. Now, if the generator had been provided with a conventional single winding, tapped off at its mid-point, each half of the winding would be on a separate part of the magnetic material of the stator member; and at high speeds, the open-circuit voltage of the winding-half which is being blocked by the rectifier would be many times the useful or output voltage of the generator at normal current, thus either grossly overburdening the rectifier by reason of the high leakage-currents therein during the non-conducting periods, or else requiring many times the number of rectifier elements in series, which is required in my system. In my double-winding generator, however, every portion of the winding-half which is not carrying current during any half-cycle is on the same stator tooth with a closely coupled portion of the winding-half which is carrying current during that half-cycle, and the mutual inductance or close coupling of these two winding-portions holds down the back-voltage on the rectifier to something like the useful voltage of the generator.

Any suitable type of half-wave rectifier 20 or 21 may be utilized. I prefer, however, to utilize a contact rectifier made up of a plurality of plates or cells of oxidized copper, such rectifiers being well known in the art.

While I have illustrated my invention in a single preferred form of embodiment, it will be obvious that many changes and modifications may be made by those skilled in the art, without departing from the essential features of my invention. I desire, therefore, that the appended claims shall be accorded the broadest construction consistent with their language and the prior art.

I claim as my invention:

1. A battery system comprising, in combination, a storage battery, a direct-current load-circuit connected thereto, a variable-speed inductor generator having a rotor-member having an annular toothed portion of magnetizable material, a stator-member having a portion thereof spaced from the annular toothed portion of the rotor-member by an air-gap, said portion of the stator-member being also toothed and of magnetizable material, the stator and rotor teeth being so spaced, circumferentially, as to produce high-frequency tooth-flux pulsations, and two generator-windings so disposed on the stator teeth as to produce a resultant alternating voltage dependent upon said tooth-flux pulsations, each generator-winding consisting of a plurality of parts disposed on a plurality of different stator teeth, each part of one winding being matched by a corresponding part of the other winding disposed on the same stator tooth, and two asymmetrically conducting means connected between the battery and the two generator-windings, respectively, the asymmetrically conducting means being oppositely connected whereby one generator-winding supplies current during one half-cycle and the other generator-winding supplies current during the next half-cycle.

2. A battery system comprising, in combination, a storage battery, a direct-current load-circuit connected thereto, a variable-speed inductor generator having a rotor-member having an annular toothed portion of magnetizable material, a stator-member having a portion thereof spaced from the annular toothed portion of the rotor-member by an air-gap, said portion of the stator-member being also toothed and of magnetizable material, said toothed portion of the stator-member spanning considerably less than the entire periphery of the rotor-member, the stator and rotor teeth being so spaced, circumferentially, as to produce high-frequency tooth-flux pulsations, and two generator-windings so disposed on the stator teeth as to produce a resultant alternating voltage dependent upon said tooth-flux pulsations, each generator-winding consisting of a plurality of parts disposed on a plurality of different stator teeth, each part of one winding being matched by a corresponding part of the other winding disposed on the same stator tooth, and two asymmetrically conducting means connected between the battery and the two generator-windings, respectively, the asymmetrically conducting means being oppositely connected whereby one generator-winding supplies current during one half-cycle and the other generator-winding supplies current during the next half-cycle.

3. A battery system comprising, in combination, a storage battery, a direct-current load-circuit connected thereto, a variable-speed alternator having two output-windings, each winding consisting of a plurality of parts disposed on a plurality of different portions of the alternator, each part of one winding being matched by a closely coupled part of the other winding disposed on the same portion of the alternator, the frequency of said alternator being so high, and the armature reaction of said alternator being so great, that the output of said alternator is inherently, even without field-strength control or external-circuit control, at an approximately constant current at speeds higher than a predetermined minimum speed, and two asymmetrically conducting means connected between the battery and the two output windings, respectively, the asymmetrically conducting means being oppositely connected whereby one output-winding supplies current during one half-cycle and the other output-winding supplies current during the next half-cycle.

4. A battery system comprising, in combination, a storage battery, a direct-current load-circuit connected thereto, a source of variable-frequency, alternating current of a type having a generated, no-load voltage of widely varying frequency and voltage, and an output current of an approximately constant type, said source including a magnetizable member and two output-windings, each output-winding consisting of a plurality of parts disposed on a plurality of different portions of said magnetizable member, each part of one winding being matched by a closely coupled part of the other winding disposed on the same portion of the magnetizable member, and two asymmetrically conducting means connected between the battery and the two output-windings, respectively, the asymmetrically conducting means being oppositely connected whereby one output-winding supplies current during one half-cycle and the other output-winding supplies current during the next half-cycle.

5. In combination, an inductor-type alternator comprising a toothed magnetizable rotor-member, a stator-member having magnetizable teeth disposed to cooperate with the rotor teeth to produce a rapid tooth-flux pulsation as the teeth pass into and out of opposition, a magnetizing means for producing flux in the alternator, and two similar windings similarly disposed on the teeth of one of the members of the alternator so as to generate an electromotive-force of tooth-pulsation frequency, each of said teeth carrying a coil of both of said windings; two half-wave rectifiers, a common direct-current load circuit, and connections whereby one alternator-winding and one rectifier supplies current to the load-circuit on alternate half-cycles of the alternator, and whereby the other alternator-winding and the other rectifier supplies current to the load-circuit on the intervening half-cycles of the alternator, the directions of the magnetic reactions of the two alternator-windings on the respective teeth on which they are wound being opposite in alternate half-cycles.

6. In combination, an alternating-current generator comprising an armature member having a magnetizable core and two similar armature-windings each having a plurality of coils similarly disposed on a plurality of different portions of said core, each of said core-portions carrying a coil of both of said windings, and a serial connection for said windings of such nature that each of said portions of the armature-core is magnetically reacted upon by two similar, serially connected portions of the two windings, respectively; two half-wave rectifiers serially connected in opposition; load-circuit terminal-connections connected to the midpoints of the windings and rectifiers, respectively; and connections between the end-terminals of the rectifiers and the respective end-terminals of the windings.

FRANK CONRAD.